July 18, 1950      L. A. CASANOVA      2,515,985

VAPOR ELECTRIC DEVICE

Filed Dec. 27, 1947      2 Sheets-Sheet 1

WITNESSES:
E.A. McCloskey
Rev. C. Groome

INVENTOR
Louis A. Casanova.
BY
S.A. Strickled
ATTORNEY

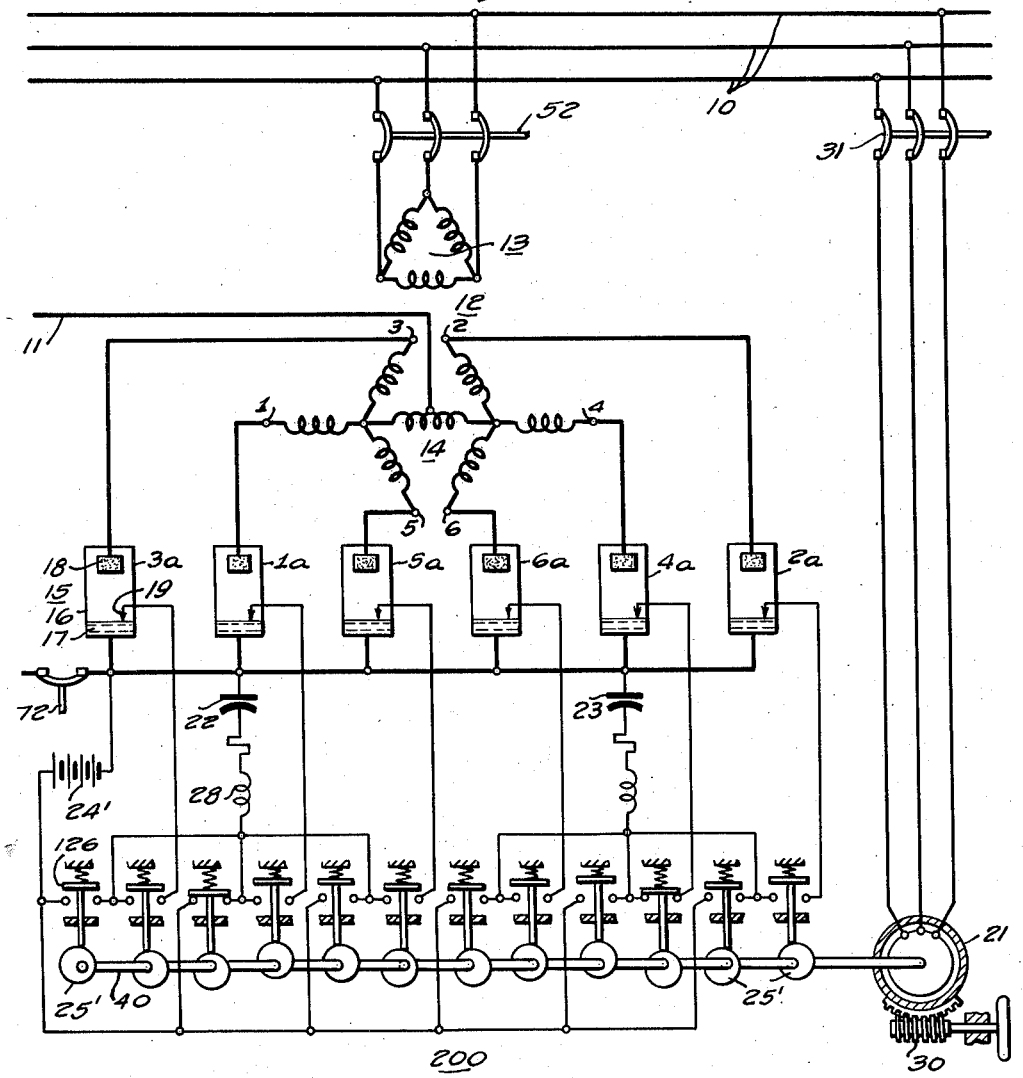

Patented July 18, 1950

2,515,985

UNITED STATES PATENT OFFICE 2,515,985

VAPOR ELECTRIC DEVICE

Louis A. Casanova, Wilkinsburg, Pa., assignor to Westinghouse Electric Corporation, East Pittsburgh, Pa., a corporation of Pennsylvania Application December 27, 1947, Serial No. 794,156

1 Claim. (Cl. 315—261)

My invention relates to a vapor electric device, and particularly to a control system for supplying impulses to the make-alive electrodes of an ignitron-type device.

In the operation of ignitrons it has been found desirable to supply control impulses to the make-alive electrode, which impulses have a very steep or rapidly rising wave front so that the cathode spot is initiated at substantially the same time interval in each succeeding half cycle. Also it is desirable to terminate the impulses as soon as possible after the cathode spot has been initiated in order to prevent burning of the make-alive electrode.

Various systems have been proposed in which a capacitor is charged over a relatively long period of time, and discharged substantially at one interval in order to get the desired high-energy impulses of short duration. The apparatus necessary to get the desired high-energy short-time impulses has become more complicated until the impulsing systems have reached a size and weight comparable to the ignitrons themselves.

According to my present invention, I propose to take advantage of recently discovered advantages in so-called contactor rectifiers to provide a relatively small light-weight control system for supplying impulses to make-alive electrodes. In the system, according to my invention, I utilize a relatively small contactor rectifying-type device to store energy in a capacitor from any suitable source, and then connect the capacitor for discharge through the make-alive electrode.

It is, accordingly, an object of my invention to provide a simple, small control system for supplying energy to a make-alive electrode.

It is a further object of my invention to provide a mechanical contactor device to control the application of make-alive impulses.

Other objects and advantages of my invention will be apparent from the following detailed description, taken in conjunction with the accompanying drawings, in which:

Fig. 3 is a schematic illustration of a further embodiment according to my invention.

Figure 1:
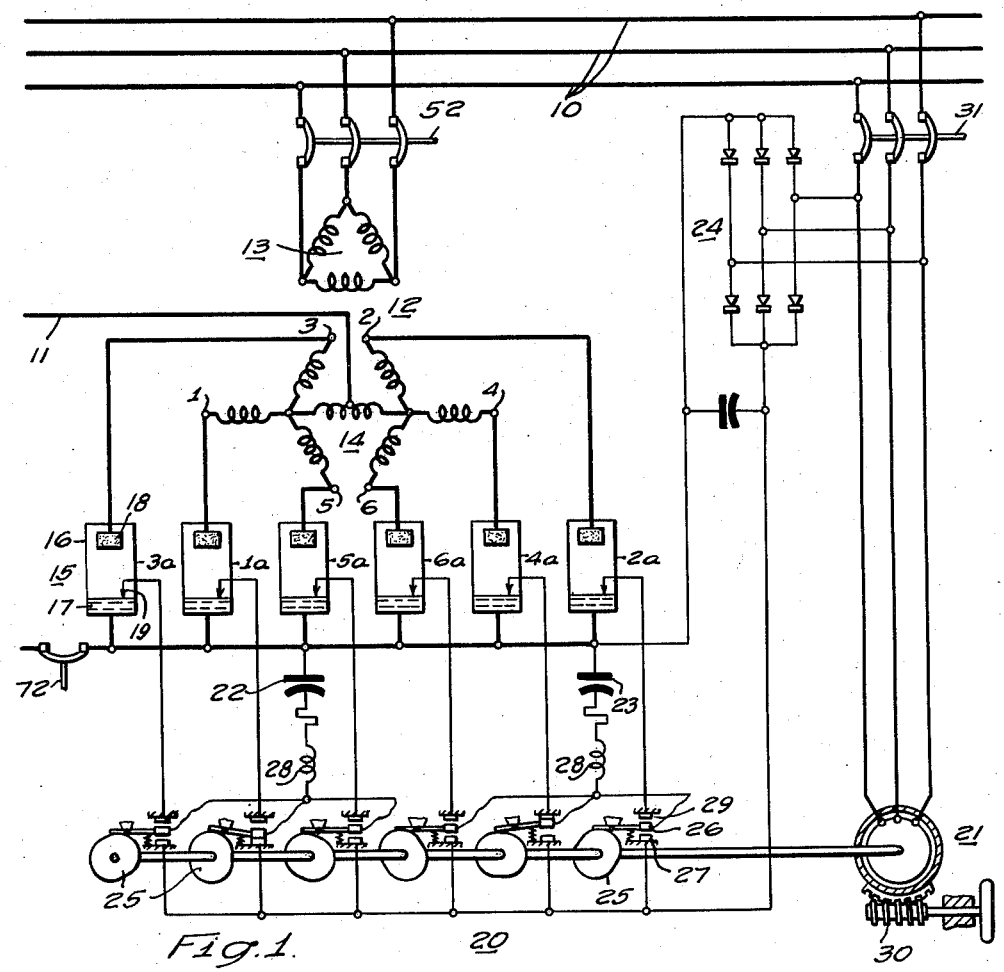
Figure 1 is a schematic illustration of a vapor electric converter embodying my invention.

In the exemplary embodiment according to Fig. 1, an alternating current circuit 10 is connected to a direct current circuit 11 by means of a transformer device 12. The transformer device 12 is preferably provided with a primary winding 13 of the polygon type connected to the polyphase circuit 10 by means of a circuit breaker 52 while a reverse current breaker 72 is usually inserted in direct current circuit 11. Associated with the polygon-type winding 13 is a star winding 14 having a plurality of output terminals 1 to 6. The flow of current through the transformer 12 is controlled by means of a plurality of make-alive type of devices 15, designated 1a to 6a, to correspond to the output terminals 1 to 6 of transformer winding 14. Each of the make-alive type devices 15 comprises a container 16 which can be substantially evacuated and in which is a vaporizable reconstructing cathode 17 usually of mercury. Spaced from and insulated from the cathode 17 is a cooperating anode 18 usually constructed of substantially inert material such as graphite. The control of current flow through the device is secured by means of a make-alive electrode 19 extending into contact with the pool of cathode material 17 during normal operation of the device.

In order to secure the desired application of impulses to the make-alive electrode 19, I have provided a control system having a mechanical contactor device 20 operated by any suitable means such as a synchronous motor 21, preferably driven from the alternating current circuit 10 or from a source in synchronism with alternating current circuit 10.

The contact device 20 is utilized to periodically charge a capacitor 22 or 23 from a suitable source of control energy, such as a polyphase A. C. system having phase terminals corresponding to the phase terminals of the converter but is usually a D. C. source such as is secured from a full-wave rectifier 24. At some interval after the capacitor is completely charged, the contactor device 20 disconnects the capacitor from the source, and at a still later interval, the contactor device 20 connects the capacitor to a make-alive electrode 19.

Figure 2:
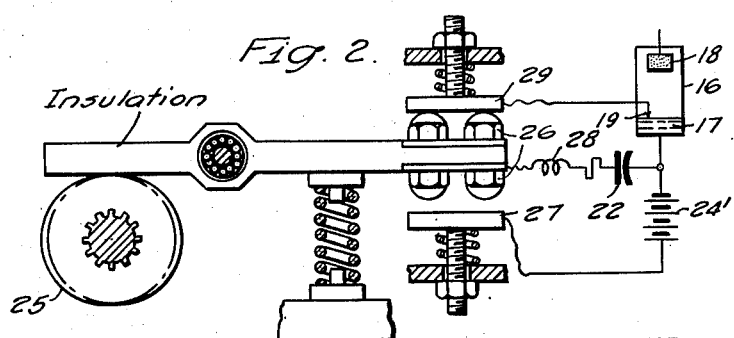
Fig. 2 is a detailed elevational sketch of a modification according to my invention.

This is most easily determined by an inspection of Fig. 2 in which a simplified embodiment utilizes a vibrating-type contactor operated by a motor driven cam 25 so that the movable contact 20 is closed against a base contact 27 to connect the source 24' across the capacitor 22. Preferably an impedance 28 is connected in series with the capacitor 22 to retard current flow until such time as the contact elements 26 and 27 have completely closed. Since the contact elements 26 and 27 are closed until the capacitor 22 has reached the potential of the source 24', the contact elements 26 and 27 may open without sparking, as no current will flow. As the cam 25 continues to rotate, the movable element 26 of the contactor 20 comes into contact with the discharge terminal 29 and the capacitor 22 is substantially immediately discharged through the make-alive electrode 19. Again the impedance device 28 retards the flow of current until the contact is completely made, and since the capacitor 22 is completely discharged, obviously no current will flow on the break operation.

The number of capacitors 22—23 necessary in a polyphase converter, such as shown in Fig. 1, is substantially dependent upon the frequency of operation of the device. At low frequency, the cam control members 25 may be designed so that one capacitor 22 may control all of a plurality of sequentially operating devices 15. However, in a polyphase circuit I prefer to utilize at least two capacitor elements 22—23 so that one of the capacitor elements 22 or 23 may be connected to the charging source 24 at the same instant that the other is connected to a make-alive electrode 19. For this operation I prefer to arrange the cam devices 25 so that alternately conducting pairs of valves, such as 1a—4a, 3a—6a, etc., operate on alternate capacitors 22—23. For all the commercial frequencies, a pair of capacitors will satisfactorily control a polyphase converter.

At higher frequencies it may be necessary to apply a capacitor to each pair of alternately conducting valves, and at extremely high frequencies, a capacitor 22 may be necessary for each valve 15 as shown in Fig. 2. When utilizing direct current to charge the capacitor 22—23 it is possible to utilize electrolytic capacitors which provide a high capacity in a very small volume so that the size of the control system is only a small fraction of the size of heretofore acceptable control systems.

In the operation of this device, the driving device, such as the motor 21, will be connected to the source of energy 10 as by a contactor 31, and after it has been started, energy will be supplied to the transformer 12. The operation of the cam device 20 will move one of the contactors 26—27 into charging relation so that one of the capacitors 22 or 23 is being charged, while another of the cam elements 25 will move its contacts 26—27 into the discharging relation, that is one of the capacitors is being charged while the other is being discharged.

Control of the output potential of the converter may be secured by any phase shifting device for advancing or retarding the time interval of operation of the cam device 20. As a convenient method of securing such phase shift, I have shown means 30 for shifting the frame of the synchronous motor 21. Obviously any other well-known means, such as over-excitation or under-excitation of the field of the motor, or phase shifting of the supply potential, could be utilized for controlling the time relation of the rotating cams 25.

When alternating current is utilized to charge the capacitors 22—23 it is desirable to shift the phase of the charging potential so that the break on the charging contact occurs at substantially the peak of the voltage wave so that the current interrupted will be substantially zero.

When excessively high voltages are utilized to fire the ignitrons, the vibrating type of contactor 26 may be dispensed with and the so-called tappet-type contactor 126 utilized to secure a more effective make and break circuit between the charging source 24' and the capacitors 22—23, and between the capacitors 22—23 and the make-alive electrodes 19.

While various types of tappet-driven contactors 280 are now well known, I prefer to utilize a cam shaft 40 having the cams 25' arranged so that the capacitors 22—23 are alternately charged and discharged, being discharged to sequentially initiate conducting intervals in the successively conducting valves 15.

While, for the purpose of illustration, I have shown and described specific embodiments of my invention, it will be apparent that changes and modifications can be made therein without departing from the true spirit of my invention or the scope of the appended claim.

I claim as my invention:

A control system for a plurality of successively conducting electric valves of the make-alive type comprising a make-alive electrode in each valve, a source of unidirectional control potential, circuit means including a mechanical contactor for periodically connecting said source in charging relation to said capacitor, and circuit means including a mechanical contactor for periodically connecting said capacitor to discharge through successive ones of said make-alive electrodes between said charging connections.

LOUIS A. CASANOVA.

REFERENCES CITED

The following references are of record in the file of this patent:

UNITED STATES PATENTS

| Number | Name | Date |
|---|---|---|
| 2,008,675 | Bangratz | July 23, 1935 |